(No Model.)  H. E. SMITH.  2 Sheets—Sheet 2.
BALING PRESS.

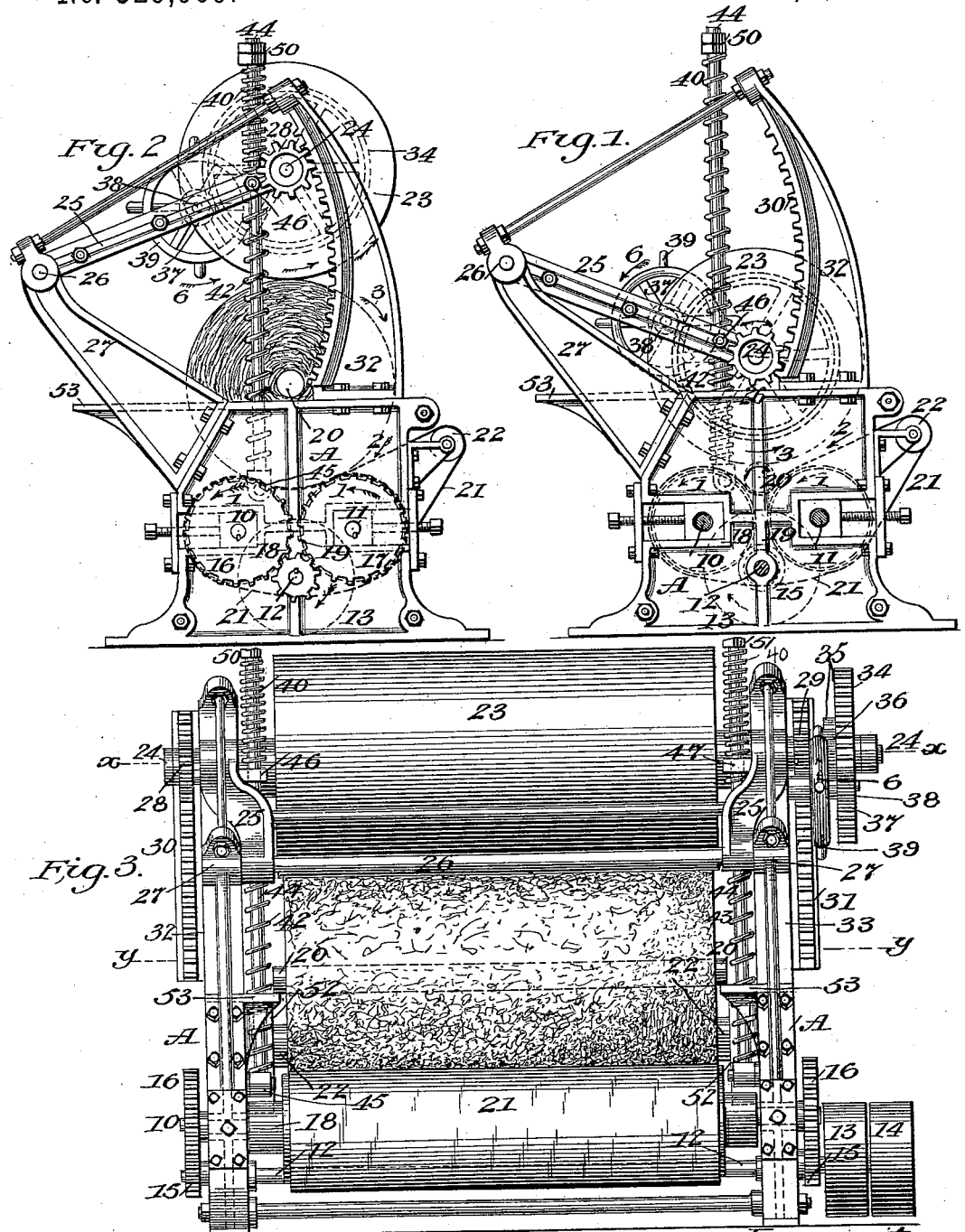

No. 529,969.  Patented Nov. 27, 1894.

Witnesses  Inventor.
Alex Scott  Hamilton E. Smith,
A M Long  by Whitman & Wilkinson
Attys.

UNITED STATES PATENT OFFICE.

HAMILTON E. SMITH, OF PHILADELPHIA, PENNSYLVANIA, ASSIGNOR TO THE BESSONETTE COTTON COMPRESS MANUFACTURING COMPANY, OF WACO, TEXAS.

BALING-PRESS.

SPECIFICATION forming part of Letters Patent No. 529,969, dated November 27, 1894.

Application filed November 6, 1894. Serial No. 528,004. (No model.)

*To all whom it may concern:*

Be it known that I, HAMILTON E. SMITH, a citizen of the United States, residing at Philadelphia, in the county of Philadelphia and State of Pennsylvania, have invented certain new and useful Improvements in Baling-Presses, (which were described in my application filed May 18, 1893, which application became forfeited;) and I do hereby declare the following to be a full, clear, and exact description of the invention, such as will enable others skilled in the art to which it appertains to make and use the same.

This invention relates to certain improvements in apparatus for baling cotton as pointed out in the following specification and claims and illustrated in the accompanying drawings, in which—

Figure 4:
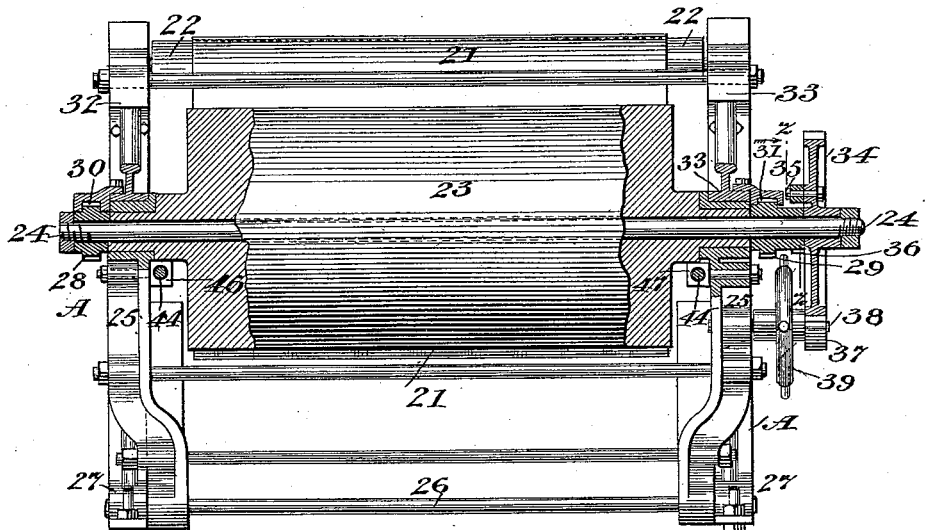
Figure 5:
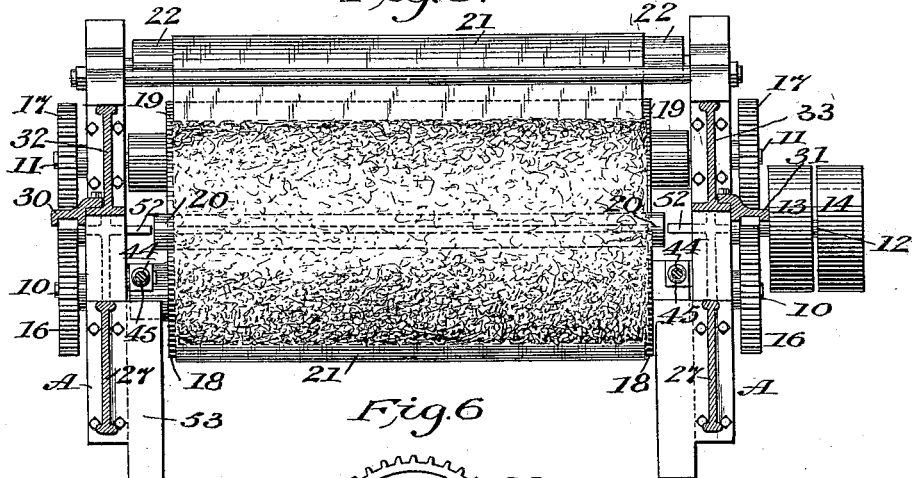
Figure 6:
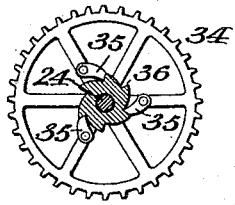

Figure 1 represents a side elevation partly in section, showing the working parts in position at the beginning of the operation of forming a bale. Fig. 2 is a side elevation showing the working parts in position when the bale has been completed. Fig. 3 is a front view of the same. Fig. 4 is a horizontal section in the plane $xx$ of Fig. 3. Fig. 5 is a horizontal section in the plane $yy$ of Fig. 3. Fig. 6 is a vertical transverse section in the plane $zz$ of Fig. 4.

The object of this invention is to provide a baling machine of such cheap and simple construction as to be within the reach of the cotton planter and adapted to be located at the ginnery, and of such a construction as to take the cotton direct from the condenser, and reduce the same to a compact compressed bale.

In the drawings the letter A designates the frame which supports the working parts of my press.

18 and 19 are two drums which are mounted on shafts 10, 11 and geared with the driving shaft 12, on which are mounted a fast pulley 13 and a loose pulley 14, and two pinions 15, which engage cogwheels 16 and 17, mounted respectively on the shafts 10 and 11 of the drums 18 and 19, which serve to support the core 20, the gear being arranged in such a manner that the two drums revolve in the same direction and with the same superficial velocity.

The cotton bat is introduced by means of an endless apron 21, which extends over a drum 22, and around the drums 18, 19, as shown in Figs. 1 and 2; and at the beginning of the operation the core 20 is placed upon the endless apron so as to depress the same and hold it in contact with the drums 18, 19. If these drums are rotated in the direction of the arrows 1, marked on them in Fig. 1, the apron 21 is caused to move in the direction of the arrow 2, and the cotton bat, which is drawn from the condenser and spread upon the endless apron 21, is pushed in so that it catches between the core 20 and the apron; and since the core revolves in the direction of arrow 3, the bat winds up on the core. The core 20 is pressed downward by a vertically movable gravitating compression roller 23, which is mounted loosely on an arbor 24, and this arbor has its bearings in a frame composed of arms 25 which swing on a rod 26 mounted in standards 27 which are firmly secured to the frame A. The shaft 24 extends beyond the ends of the compression roller 23, and at or near its outer ends are mounted pinions 28, 29, which engage segmental rack bars 30, 31, formed on the inner faces of standards 32, 33, which are firmly secured to the frame A.

On one end of the shaft 24 is loosely mounted a cogwheel 34, which is provided with dogs 35 (Fig. 6) and these dogs engage a ratchet wheel 36, which is firmly connected to or formed on the hub of the pinion 29 (Fig. 4). The cog wheel 34 engages a pinion 37 which is loosely mounted on a fixed arbor 38 and firmly connected to a hand wheel 39. By turning this hand wheel in the direction of the arrow 6 (Figs. 1 and 2) the compression roller can be forced up so that the finished bale is released from pressure and can be readily removed from the machine. The handwheel also serves to lower the compression roller after the bale has been removed. At the beginning of the operation, when the compression roller is clear down as shown in Fig. 1, it is desirable that the pressure exerted upon the bale as the same begins to form, shall be less than it is when the diameter of the bale increases, and in order to regulate the pressure exerted by the compression roller upon the bale I have provided a compensating mechanism which may be composed of weights or springs. In the example shown in the drawings, I have shown two pairs of springs 40, and 42, 43. Each pair of springs is placed on a rod 44, and these rods are connected to the frame A by means of pivots 45, and they pass through swiveled eyes 46, 47, which are secured to the arms 25. The springs 40 and 41 are confined between the eyes 46 and 47 and nuts 50, 51, which are secured to the top ends of the rods 44, and the springs 42, 43 are confined between the swiveled eyes 46, 47, and the hubs formed at the bottom ends of said rods.

At the beginning of the operation, when the compression roller is clear down in the position shown in Fig. 1, the springs 40 and 41 are expanded, so that they add very little, if anything, to the weight of the compression roller, while the springs 42 and 43 are compressed so that they exert considerable upward pressure, whereby the downward pressure of the compression roller is reduced. As the diameter of the bale increases, the upward pressure of the springs 42 and 43 is reduced and when the bale is about half finished, the upward pressure of the springs 42, 43, becomes equal to the downward pressure of the springs 40, 41, and consequently the bale is exposed to the full weight of the compression roller. From that time the downward pressure of the springs 40, 41, increases while the upward pressure of the springs 42, 43, decreases, and the downward pressure exerted by the compression roller is gradually increased, until the bale is completed. On the inside of the frame A are formed ribs 52 which prevent the core 20 from moving endwise while the bale is being formed and from said frame extend rails 53 which facilitate the operation of removing the finished bale from the machine.

Having thus described my invention, what I claim, and desire to secure by Letters Patent of the United States, is—

1. The combination of a vertically movable core which rises as the material winds thereupon, supporting drums, an endless feed apron passing around the supporting drums and acting to deliver the material to the core, and a vertically movable pivoted swinging frame carrying a rotary compression roller acting on the uppermost side of the bale being formed for pressing the same downwardly upon the belt, substantially as described.

2. The combination of a vertically movable core which rises as the material winds thereupon, supporting drums geared together, an endless feed apron passing around the supporting drums and upon which the core normally rests at a point between the supporting drums, a rotary gravitating compression roller acting on the uppermost side of the bale being formed to press the bale downwardly upon the belt, and a pivoted swinging frame in which the compression roller is journaled, substantially as described.

3. The combination in a machine for winding cotton into bales, of a vertically movable core which rises as the material winds thereupon, a suitable bale support, a rotatable gravitating compression roller acting on the uppermost side of the bale being formed, a pivoted swinging frame in which the compression roller is journaled, and mechanism for lifting the vertically movable frame and compression roller to release the finished bale, substantially as described.

4. In an organized machine for winding cotton into bales, the combination of the following elements, to wit—a core on which the cotton is wound into a bale, a suitable bale support, a compression roller moved vertically by the increasing diameter of the bale, a rack-and-pinion mechanism for positively raising the compression roller to release the finished bale, and gear mechanism for rotating the pinion in engagement with the rack to elevate the compression roller, substantially as described.

5. In an organized machine for winding cotton into bales, the combination of the following elements, to wit—a core on which the cotton is wound into a bale, a suitable bale support, a vertically movable frame, a compression roller carried by said frame and moved vertically by the increasing diameter of the bale, a rack-and-pinion mechanism for positively raising the said frame and compression roller to release the finished bale, and gear mechanism for rotating the pinion in engagement with the rack to elevate the vertically movable frame and compression roller, substantially as described.

6. In an organized machine for winding cotton into bales, the combination of the following elements, to wit—a core on which the cotton is wound into a bale, a suitable bale support, a vertically movable frame, a compression roller carried by said frame and moved vertically by the increasing diameter of the bale, a rack and pinion mechanism for positively raising the compression roller and frame, and a rotatable wheel geared to the shaft of the pinion for turning the latter in engagement with the rack to elevate the compression roller and frame, substantially as described.

7. The combination of a vertically movable core which rises as the material winds thereupon, supporting drums geared together, a vertically movable frame carrying a compression roller acting on the uppermost side of the bale being formed to press the same downward, and gear mechanism in operative connection with the compression roller for elevating the latter out of contact with the finished bale, substantially as described.

8. The combination of a vertically movable core which rises as the material winds thereupon, supporting drums, a vertically movable frame carrying a compression roller acting on the uppermost side of the bale being formed to press the same downward, a pinion on the shaft of the compression roller, and a rack with which the pinion engages for elevating the compression roller out of contact with the finished bale, substantially as described.

9. The combination with a core on which the bale is wound, supporting drums geared together, and a compression roller, of compensating mechanism which partly sustains the compression roller when at its lowest position and permits the full weight of the roller to act on the bale, when said roller is raised a certain distance, substantially as described.

10. The combination of a vertically movable core on which the material is wound, supporting drums rotated in the same direction, a feed apron passing around the supporting drums and adapted to support and rotate the core and also to feed the material thereto, a compression roller which rises as the bale is formed, and spring compensating-mechanism which partly sustains the compression roller when at its lowest position and permits the full weight of the roller to act on the bale when said roller is raised a certain distance, substantially as described.

11. The combination with the core, the supporting drums and the compression roller of swinging arms 25 which form the bearings for the arbor 24 of the compression roller, rackbars 30, 31, formed on standards secured to the frame, and pinions 28, 29, mounted on the arbor 24 and geared with the rackbars substantially as described.

12. The combination of a vertically movable core which rises as the material winds thereupon, supporting drums geared together, an endless feed apron passing around the supporting drums and upon which the core is adapted to rest, a compression roller, and rails 53 located above the supporting drums for removing the bale after the core rises above the rails during the formation of a bale, substantially as described.

In testimony whereof I affix my signature in presence of two witnesses.

HAMILTON E. SMITH.

Witnesses:
E. F. SMITH,
NATHAN H. ROBBINS.